Inventor:
Paul Lieberknecht

Patented July 19, 1932

1,867,705

UNITED STATES PATENT OFFICE

PAUL LIEBERKNECHT, OF EINSIEDEL-CHEMNITZ, GERMANY, ASSIGNOR OF ONE-HALF TO MASCHINENFABRIK-EINSIEDEL, GESELLSCHAFT MIT BESCHRANKTER HAFTUNG, OF EINSIEDEL, NEAR CHEMNITZ, GERMANY

AUXILIARY DRIVE FOR FLAT HOSIERY FRAMES

Application filed September 19, 1931, Serial No. 563,774, and in Germany October 6, 1930.

The present invention relates to an auxiliary drive for flat hosiery frames.

Flat hosiery frames, and particularly cotton machines, are, in addition to being equipped with a mechanical drive, provided with a device which enables the operator to move the machine by hand. This device consists, as a rule, of a shaft arranged in front of and along the machine and fitted with hand wheels for actuating the machine parts moved by a motor or other driving means through the medium of a pair of cog-wheels. Such a device for moving the machine by hand after stopping the mechanical drive is required, for instance, in order to effect correct adjustment during the insertion of the bar, and experience has shown that long frames, such as 28 gauge cotton machine and the like, can be moved by hand only with great difficulty and that the exertion involved is injurious particularly to youthful and female operators who are not unusually strong physically.

In order to overcome these drawbacks, the invention provides flat hosiery frames with a geared transmission mechanism adapted to act directly or indirectly on the machine parts chiefly to be moved, so that these parts may be controlled from this point at the expenditure of very little power. The type of gear and the manner of arranging it are variable within very wide limits, though it is preferred to connect the gear with the hand wheel shaft and to employ a worm gear to attain a high ratio of gearing. The new auxiliary driving device is connected also with a device for stopping the driving mechanism during the operation of the machine.

This gear is further connected with a device which, if the gear is moved, prevents the rod controlling the engagement of the machine from moving and, after stopping of the gear, permits the disengagement of the machine.

Figure 1:
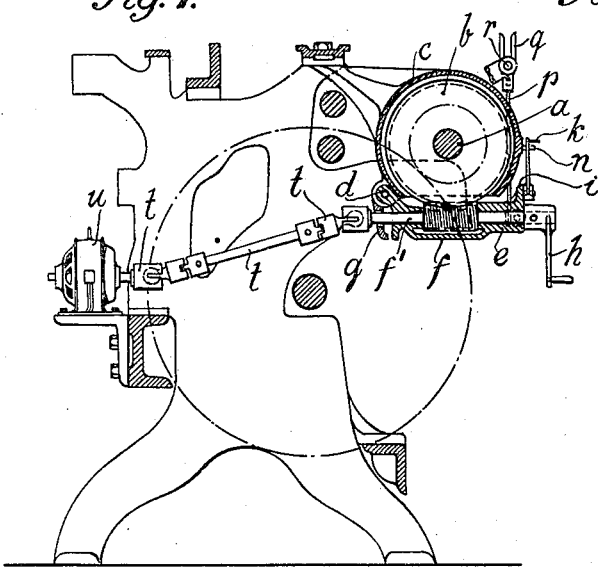
Figure 2:
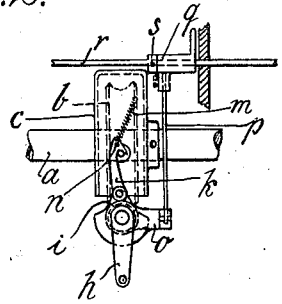
Figure 3:
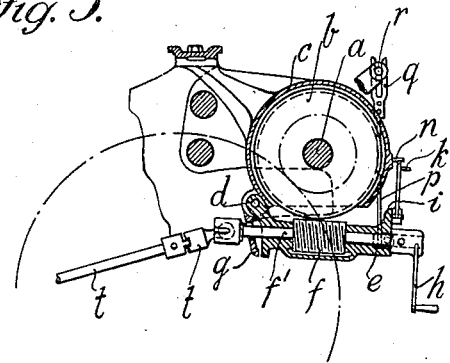
Figure 4:
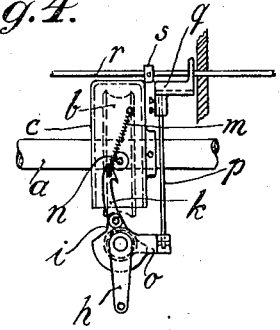

By way of example, one embodiment of the invention is illustrated in the accompanying drawing, in which Figure 1 is a front view of a cotton machine with the worm gear thrown in, according to the invention; Fig. 2, a front view of the driving parts in corresponding position; Fig. 3, a view of the driving device according to Fig. 1 with the worm gear disconnected; and Fig. 4, a front view of the driving parts according to Fig. 3.

Referring to the drawing, the shaft $a$ permitting manual driving of the machine carries a long worm wheel $b$ surrounded by the protective casing $c$ which at $d$ is provided with an oscillatory movable casing $e$ serving as bearing for the worm $f$ and, in disengaged condition, (Fig. 3) striking the stop $g$ of the casing $c$ whereby further motion of the worm $f$ is prevented. With the worm shaft $f'$ a crank $h$ is connected, and the movable casing $e$ has a flange $i$ provided with the rotatable hook $k$.

When the machine runs heavily and the shaft $a$ is to be turned by hand, the worm shaft $f'$ is lifted so that its worm $f$ meshes with the worm wheel $b$, whereupon the shaft $a$ can be turned easily by means of the crank $h$. During the lifting of the worm shaft $f'$ the hook $k$, owing to the action of the spring $m$, has placed itself around the pin $n$ secured to the protective casing $c$ and thus holds the worm $f$ in working position. By releasing the hook $k$ from the pin $n$ the oscillatory parts $e$, $f$, $f'$ may be lowered to bring the worm $f$ out of engagement with the worm wheel $b$.

However, the worm shaft $f'$ can be moved also by motor power by connecting it, by means of articulated rods, with an electric motor $u$ or another mechanical driving medium.

The bush flanges $i$ are provided with a cast-on finger $o$, carrying a rod $p$, the free end of which forms the fork $q$. When the bush $e$ is lifted, the fork $q$ slides with its full width within the range of motion of the rod $r$ controlling the engagement and disengagement of the mechanical motion of the machine, so that the adjusting ring $s$ disposed on the rod $r$ is directly in front of the fork $q$. This adjusting ring $s$ and the angle or fork $q$ prevent, therefore, motion of the rod $r$ to the right, i. e., the engagement of the machine, while the possibility of motion of the shaft $a$ by the gearing exists. When the worm is disconnected, the fork $q$ will release the rod $r$.

I claim:—

1. An auxiliary drive for flat hosiery machines, comprising a driving shaft, a worm wheel secured to the said driving shaft, and a worm adapted to disengageably mesh with the said worm wheel.

2. An auxiliary drive for flat hosiery frames, comprising a driving shaft, a worm wheel secured to the said driving shaft, a worm adapted to disengageably mesh with the said worm wheel, an oscillatory casing adapted to act as bearing for the said worm, and means connected with the said casing for limiting the motion of the said worm in disengaged position and for temporarily holding the said worm during the period of engagement.

3. In an auxiliary drive according to claim 1, means for causing the engagement of the machine and a device comprising a fork and two rods adapted to control the engagement and disengagement of the machine.

4. In an auxiliary drive according to claim 1, a disengageable member, a bearing carrying the said member, a rod arranged on the said bearing, a disengaging bar for the mechanical machine drive, and means carried by the said rod and adapted to slide within the range of motion of the said bar when the said disengageable member is engaged to prevent said bar from carrying out an engaging movement.

In testimony whereof I have affixed my signature.

PAUL LIEBERKNECHT.